(12) United States Patent
Lang et al.

(10) Patent No.: US 11,364,579 B2
(45) Date of Patent: Jun. 21, 2022

(54) FEEDER FOR SWAGEABLE LOCKBOLT COLLARS AND METHOD OF USING SAME

(71) Applicant: Gage Bilt, Inc., Clinton Township, MI (US)

(72) Inventors: Kyle R. Lang, Royal Oak, MI (US); Tony P. Potts, Warren, MI (US); Brian H. Leigh, Macomb, MI (US); Thomas M. Duchene, Clinton Township, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 261 days.

(21) Appl. No.: 16/159,216

(22) Filed: Oct. 12, 2018

(65) Prior Publication Data

US 2020/0114480 A1    Apr. 16, 2020

(51) Int. Cl.
| | | |
|---|---|---|
| *B23P 19/00* | (2006.01) | |
| *B21J 15/02* | (2006.01) | |
| *B21J 15/10* | (2006.01) | |
| *B21J 15/38* | (2006.01) | |
| *B21J 15/32* | (2006.01) | |
| *F16B 19/05* | (2006.01) | |

(52) U.S. Cl.
CPC ........... *B23P 19/004* (2013.01); *B21J 15/022* (2013.01); *B21J 15/105* (2013.01); *B21J 15/32* (2013.01); *B21J 15/38* (2013.01); *F16B 19/05* (2013.01)

(58) Field of Classification Search
CPC ..... B23P 19/004; B23P 19/007; B23P 11/005; F16B 19/05; B25B 27/146; B25B 27/10; B25B 31/10; B25B 7/22; Y10T 29/53996; Y10T 29/53657; Y10T 29/53678; Y10T 29/53896; Y10T 29/539; Y10T 29/53917; Y10T 29/53987; B21D 39/04; B21D 39/046; B21D 39/048; B21J 15/32; B21J 15/022
USPC ...... 29/243.5; 81/57, 37, 430, 431, 432, 433
See application file for complete search history.

(56) References Cited

U.S. PATENT DOCUMENTS 2,529,165 A * 11/1950 Knowles .................. B21J 15/32
                                                                 72/424
3,143,903 A    8/1964 Van Hecke
(Continued)

OTHER PUBLICATIONS

International Search Report and Written Opinion in co-pending PCT Application PCT/US2019/050279 dated Nov. 18, 2019.

*Primary Examiner* — Tyrone V Hall, Jr.
*Assistant Examiner* — Makena S Markman
(74) *Attorney, Agent, or Firm* — Young Basile Hanlon & MacFarlane, P.C.

(57) ABSTRACT

A device is disclosed for supplying swageable collars from a magazine to a swaging tool such that the collars may be affixed to the shanks of lockbolts in a series of application steps. The feeder device can be mounted on the nose assembly of a swaging tool so that collar feeding and swaging can be accomplished in a single-handed operation. The feeder device responds to contact pressure against a work surface during a collar placement maneuver to release a collar from a presentation position for normal swaging. Releasing pressure on the workpiece allows a lower assembly of the feeder device to lift the next collar available from a magazine into the presentation position for application to the next lockbolt shank in a series of lockbolts to be finished.

3 Claims, 13 Drawing Sheets

(56) References Cited

U.S. PATENT DOCUMENTS

| | | | | |
|---|---|---|---|---|
| 3,760,485 A * | 9/1973 | Smith | ............... | B23P 19/006 |
| | | | | 29/813 |
| 3,886,783 A * | 6/1975 | Hirsch | ............... | F16B 19/10 |
| | | | | 29/812.5 |
| 4,089,099 A * | 5/1978 | Nivet | ............... | B21J 15/041 |
| | | | | 227/120 |
| 4,604,889 A * | 8/1986 | Sukharevsky | ......... | B21J 15/105 |
| | | | | 227/112 |
| 4,852,376 A * | 8/1989 | Suhov | ............... | B21J 15/32 |
| | | | | 29/812.5 |
| 5,239,900 A * | 8/1993 | Macris | ............... | B23P 19/006 |
| | | | | 227/48 |
| 5,337,636 A * | 8/1994 | Shea | ............... | B25B 23/04 |
| | | | | 221/220 |
| 5,490,311 A | 2/1996 | Rosier | | |
| 5,697,521 A * | 12/1997 | Dixon | ............... | B21J 15/022 |
| | | | | 221/297 |
| 6,796,454 B1 * | 9/2004 | Matthews | ............... | B21J 15/32 |
| | | | | 221/197 |
| 6,817,074 B2 * | 11/2004 | Lalonde | ............... | B21J 15/043 |
| | | | | 29/243.521 |
| 7,677,853 B2 | 3/2010 | Donovan | | |
| 7,921,530 B2 | 4/2011 | Mercer et al. | | |
| 8,485,410 B1 * | 7/2013 | Harshman | ............... | B25C 1/001 |
| | | | | 227/120 |
| 9,421,604 B2 * | 8/2016 | Ikeda | ............... | B21J 15/142 |
| 9,511,416 B2 | 12/2016 | Godfrey et al. | | |
| 10,081,050 B2 | 9/2018 | Godfrey | | |
| 10,113,580 B2 * | 10/2018 | Slaughter | ............... | B21J 15/022 |
| 10,272,486 B2 * | 4/2019 | Sun | ............... | B21J 15/105 |
| 11,033,952 B2 * | 6/2021 | Chan | ............... | B21J 15/022 |
| 2004/0205950 A1 | 10/2004 | Schmitt | | |
| 2007/0295779 A1 * | 12/2007 | Fulbright | ............... | B21J 15/105 |
| | | | | 227/138 |
| 2014/0201972 A1 | 7/2014 | Butvin et al. | | |
| 2017/0051777 A1 * | 2/2017 | Slaughter | ............... | F16B 39/026 |
| 2018/0073539 A1 | 3/2018 | Suttles | | |
| 2020/0094312 A1 * | 3/2020 | Chan | ............... | B21J 15/142 |

\* cited by examiner

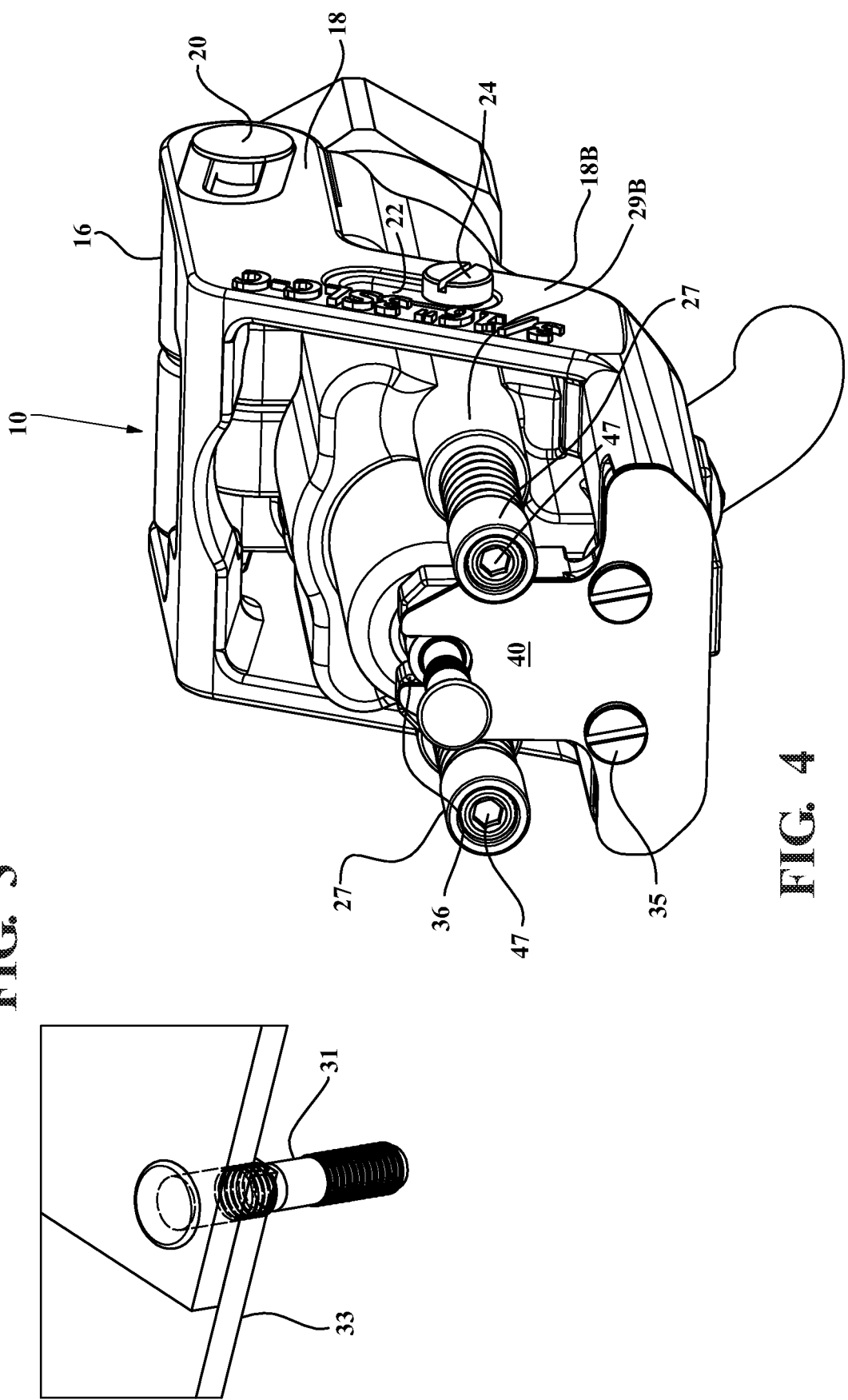

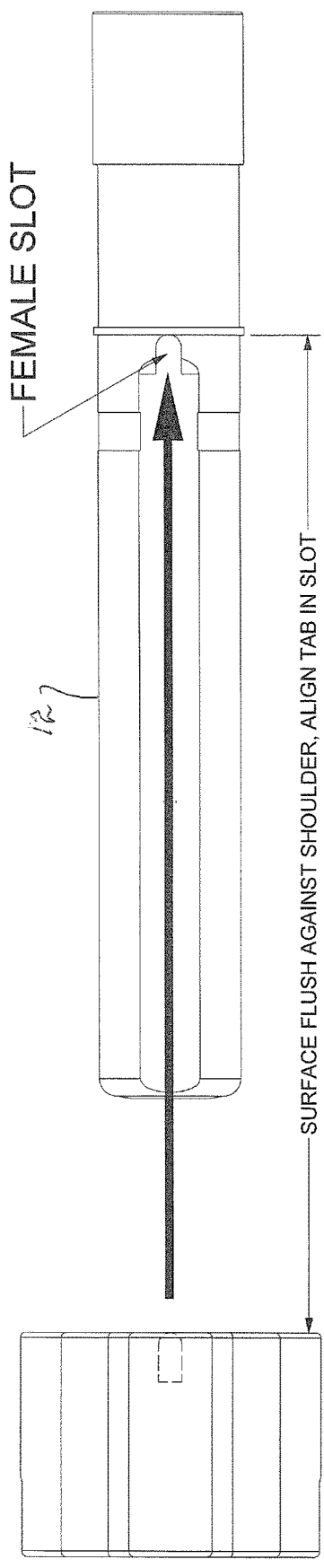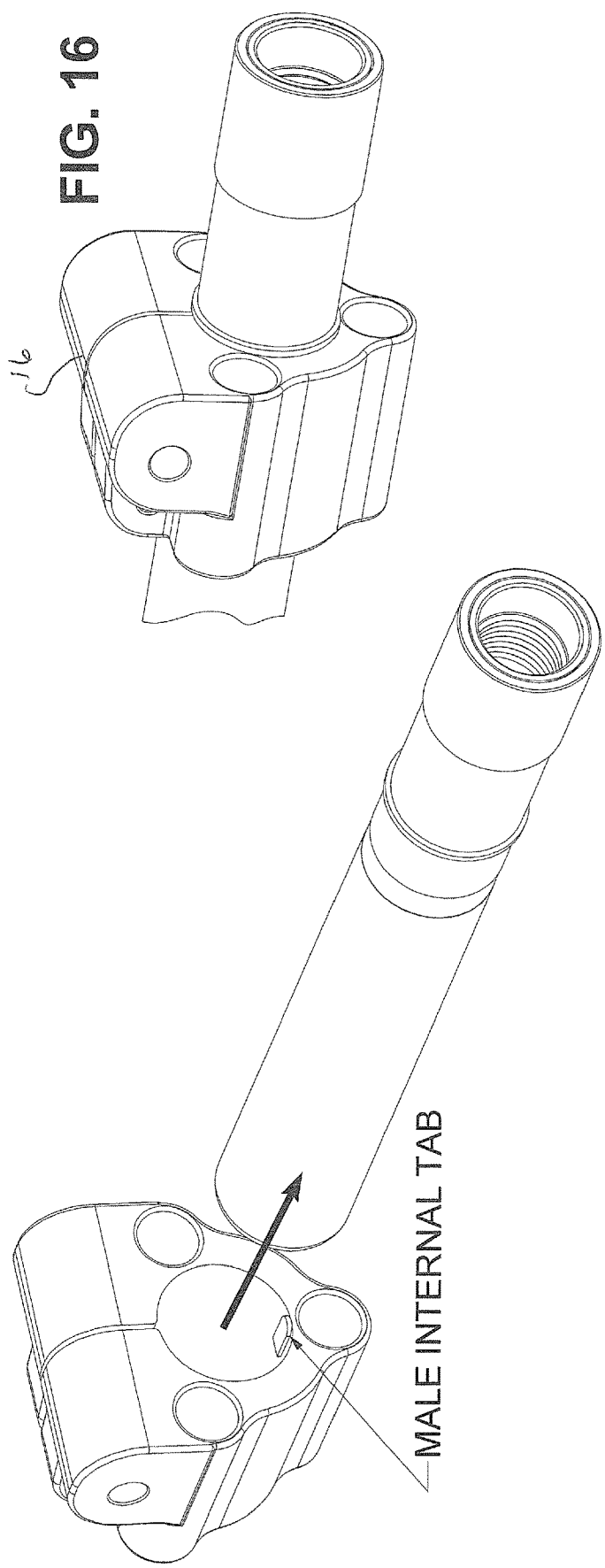

FEEDER FOR SWAGEABLE LOCKBOLT COLLARS AND METHOD OF USING SAME

FIELD OF THE INVENTION

This document discloses a method and apparatus for feeding swageable collars to a presentation position on a swaging tool in such a fashion that the collars may be serially swaged. onto the shanks of pre-located lockbolts in a convenient and efficient fashion.

BACKGROUND OF THE DISCLOSURE

A well-known mechanical fastening system involves the use of lockbolts each having a head and a grooved shank designed to receive a swageable collar which, after being placed on the shank, is deformed into substantially permanent association with the lockbolt shank. The finished lockbolt has fastening characteristics similar to conventional rivets.

The process for installing lockbolts begins with placing the lockbolts in preformed holes in the parts to be joined; the shanks of the lockbolts are exposed awaiting the placement of collars thereon and the swaging of those collars into permanent association with the lockbolt shank by a manually operated tool.

The operator of the tool places a collar on each lockbolt and thereafter triggers the tool to swage; i.e., deform, the collar into permanent association with a grooved portion of the lockbolt shank. The tool also typically breaks off a portion of the shank known as a "pintail."

Collar feeders can be separate from the swaging tool; for example, expired U.S. Pat. No. 5,697,521 assigned to Huck International shows a hand-held collar dispenser with spring bias clips 44 feeding collars one at a time to a presentation or "ready" position. Another collar feeder is described is U.S. Pat. No. 9,511,416 assigned to Gage Bilt, Inc. of Clinton Township Mich., the Applicant in the present application.

BRIEF SUMMARY OF THE DISCLOSURE

As is more fully described herein an illustrative embodiment of the invention comprises a lockbolt collar feeder device that can be attached to an independently operable swaging tool having a working axis to simplify the function of placing deformable collars onto the shanks of lockbolt that have been pre-located in a workpiece in preparation for swaging by the tool. The collar feeder device can be removed from the tool without disrupting the operation of the tool and, therefore, can move from tool to tool as necessary. In general, the feeder device comprises a first assembly adapted to mounted in a fixed position on the tool and in alignment with the working axis. A second assembly is also mounted on the tool axially forward of the first assembly and axially moveable relative to the first assembly. A third assembly in the form of a collar transfer assembly is pivotally connected to the first assembly and includes a collar gripper adjacent a stop plate at the front end. This assembly is further connected to a magazine that contains a stack of coaxial collars. The second assembly includes axially oriented members such as rods normally extending forwardly of the tool nose such that the ends of the rods can be brought into contact with the surface of a workpiece ahead of the gripper and adjacent a lockbolt shank onto which a collar is to be located and swaged. The rods are pushed rearwardly against resistance provided by a set of biasing springs by placing the forward contact ends of the rods against the workpiece adjacent a lockbolt shank and then pressing the tool forwardly against the resistance of the springs until the collar held by the gripper has been placed on a lockbolt shank. This forward push causes the gripper holding the collar which has been placed on the lockbolt shank to release the collar and move away from the in-place collar toward the outlet of the magazine where it receives a second collar. Release of the tool from the forwardly pushed position after the installed collar has been swaged allows the rods to move back forwardly again to brings the collar transfer assembly back to a position where a newly gripped collar is placed on the tool axis ready to be installed on a second lockbolt shank. This operation can be repeated for as many times as necessary to fill all of the lockbolts with swaged collars. The tool can be of any several makes including the Gage Bilt LGP06-2480-45CF. This tool is available from Gage Bilt Inc from Clinton Township Mich.

The term "presentation position", as used herein, refers to the ready position of a collar held by the gripper at the front of the feeder device and in alignment with the working axis of the swaging tool whereby an operator can slide the collar axially onto the exposed shank of a pre-positioned lockbolt. The term "loading position" refer to the position of the collar gripper at the outlet of the collar magazine.

As further described herein, with respect to an illustrative embodiment of the invention, the movement of the collar transfer assembly is performed by the aforementioned rods straddling the tool nose and extending axially forward past the front moveable body assembly 100. The springs associated with the rods are compressed when the rods are pushed back into the front assembly and shoulder bolts on the rods working in cam slots in arms that are part of the transfer assembly produce the pivotal motion that moves the assembly 18 and the gripper away from the axially aligned position so it can received another collar from the outlet of the magazine.

In operation, the operator places the contacts on the forward ends of the rods 34 against a work surface adjacent the exposed shank of a lockbolt and with a collar in alignment with the lockbolt shank but not yet swaged. The operator thereafter pushes the tool forward. This forward push compresses the springs releasing the gripper from the collar that has been placed onto the lockbolt. The operator then pulls the trigger on the tool to swage the now in-place collar. This resilient compression action also causes the actuating arms to pivot the gripper away from the installed collar to a position where it can receive the next collar from the outlet of the magazine. When the operator withdraws the tool, the rods 34 re-extend to pivot the collar transfer assembly 18 back up to place the retrieved collar in the presentation position where it is axially aligned with the swaging tool.

The feeder device is adapted to be connected to a collar supply device such as an air-driven tube loaded with serially-arranged co-axial collars. In brief, movement between the front movable body and lower feeder assemblies, caused by steps performed by the tool operator, transfers collars one at a time between the outlet of the supply tube and a presentation position on the front movable body assembly. As the operator places a collar on a lockbolt, activates the tool to swage the collar and withdraws the tool from the finished lockbolt, the feeder automatically places the next collar in the presentation position.

BRIEF DESCRIPTION OF THE DRAWING

The inventive subject matter disclosed herein has both apparatus and method aspects, both of which are described below with reference to the accompanying drawings, showing an operative embodiment of the apparatus invention in detail. The drawings are to scale unless otherwise indicated.

FIG. 3 is a perspective view of a pintail type lockbolt mounted in a pair of plates to be fastened together and is not to scale as far as representing the entire spectrum of workpieces that can be joined by lockbolts;

FIG. 4 is a front perspective of the feeder moving a collar onto a lockbolt, but with the lower assembly still in the raised position;

FIG. 15 shows the unique design of the female slot n the barrel of the nose assembly and the male tab on the rear stationary body; and FIG. 16 shows the rear stationary body fully engaged into the slot on the barrel of the nose assembly and positioned against the shoulder.

DETAILED DESCRIPTION AN ILLUSTRATIVE EMBODIMENT

Figure 1:
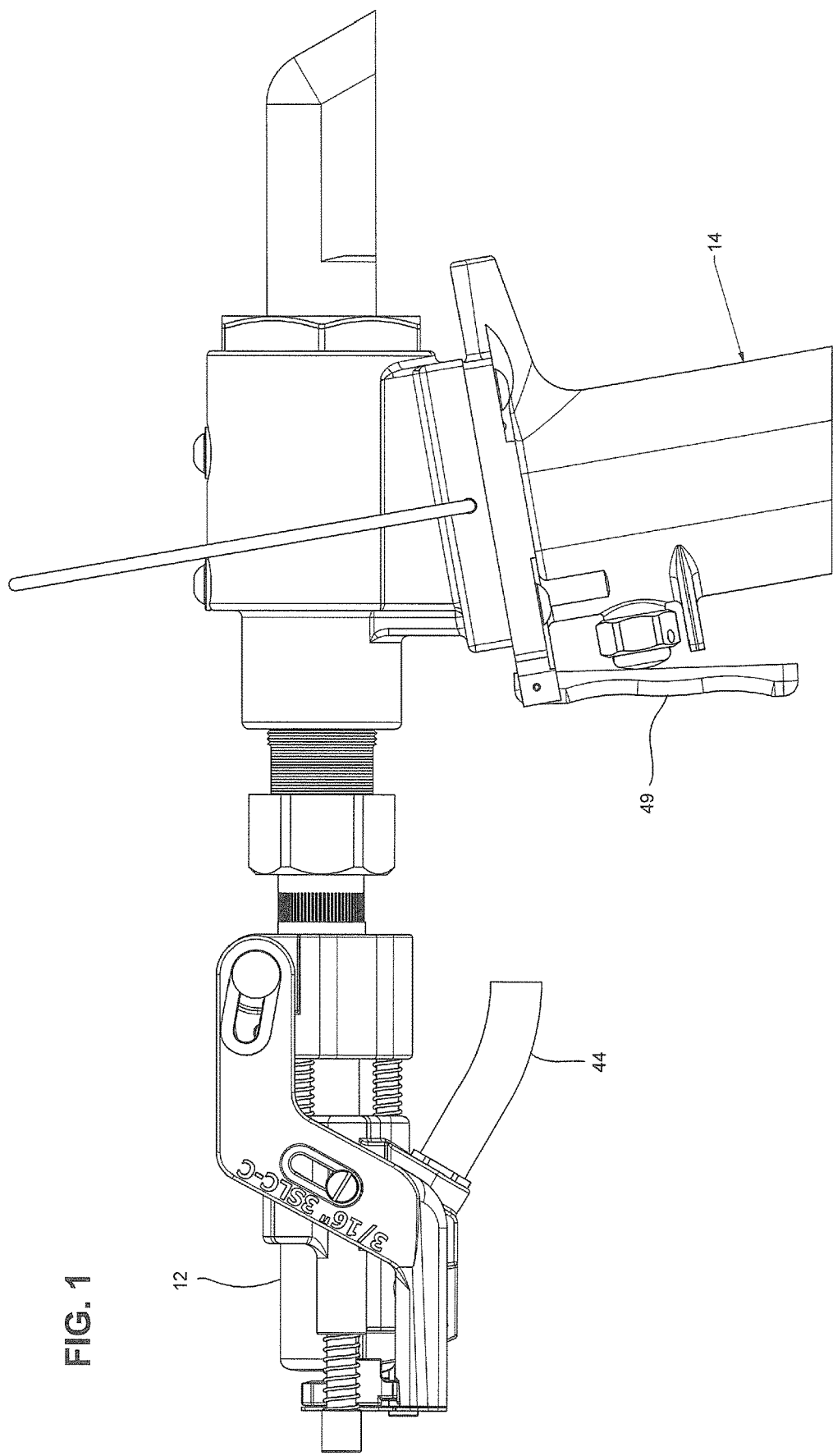
FIG. 1 is a side view of a collar feeder mounted on a Gage Bilt Model GB731 swaging tool.

Referring to the Figures, the collar feeder device 10 is shown both individually and as mounted on the nose assembly 12 of a Gage Bilt Model GB731 swaging tool 14. The feeder device 10 comprises a rear stationary body assembly 16 configured to be removably mounted on the nose assembly 12 of the swaging tool 14, a movable front assembly 100 and a pivotal lower assembly 18 having a gripper adapted to receive collars serially from a collar magazine tube 44 and transfer them, one at a time, to a "presentation" position in line with the nose assembly. The assembly 16 is partially split by a longitudinal slot to allow mounting the device on the nose assembly. Screws 15 tightens the two sides to secure device 10 in place on the nose assembly 12. The lower assembly 18 has "dog leg" shaped arms that straddle the front moveable assembly 100 and the rear stationary assembly 16. The lower assembly arm members 18A and 18 B are connected to the rear stationary assembly 16 at the rearward end by means of a pivot pin 20 which receives one of the screws 15 and allows the lower assembly arms to move angularly about the axis of pivot pin 20 between a raised "presentation" position shown in FIGS. 2, 3, 8, and 9 and a lower loading position shown in FIGS. 10 and 11. Slots 101 become parallel to the nose assembly when the lower assembly reaches the loading position thus allowing the lower and front movable assemblies to remain stationary while the barrel and the rear stationary body are urged forward during the swaging process of the collar.

The arms 18A and 18B are each configured with diagonal slots 22 which receive the shanks of shoulder bolts 24 threaded into slidable elements 34 in the front movable body assembly 100 to cause the pivotal motion between the front movable body 100 and rear stationary body 16 and 18 respectively as hereinafter described.

Figure 2:
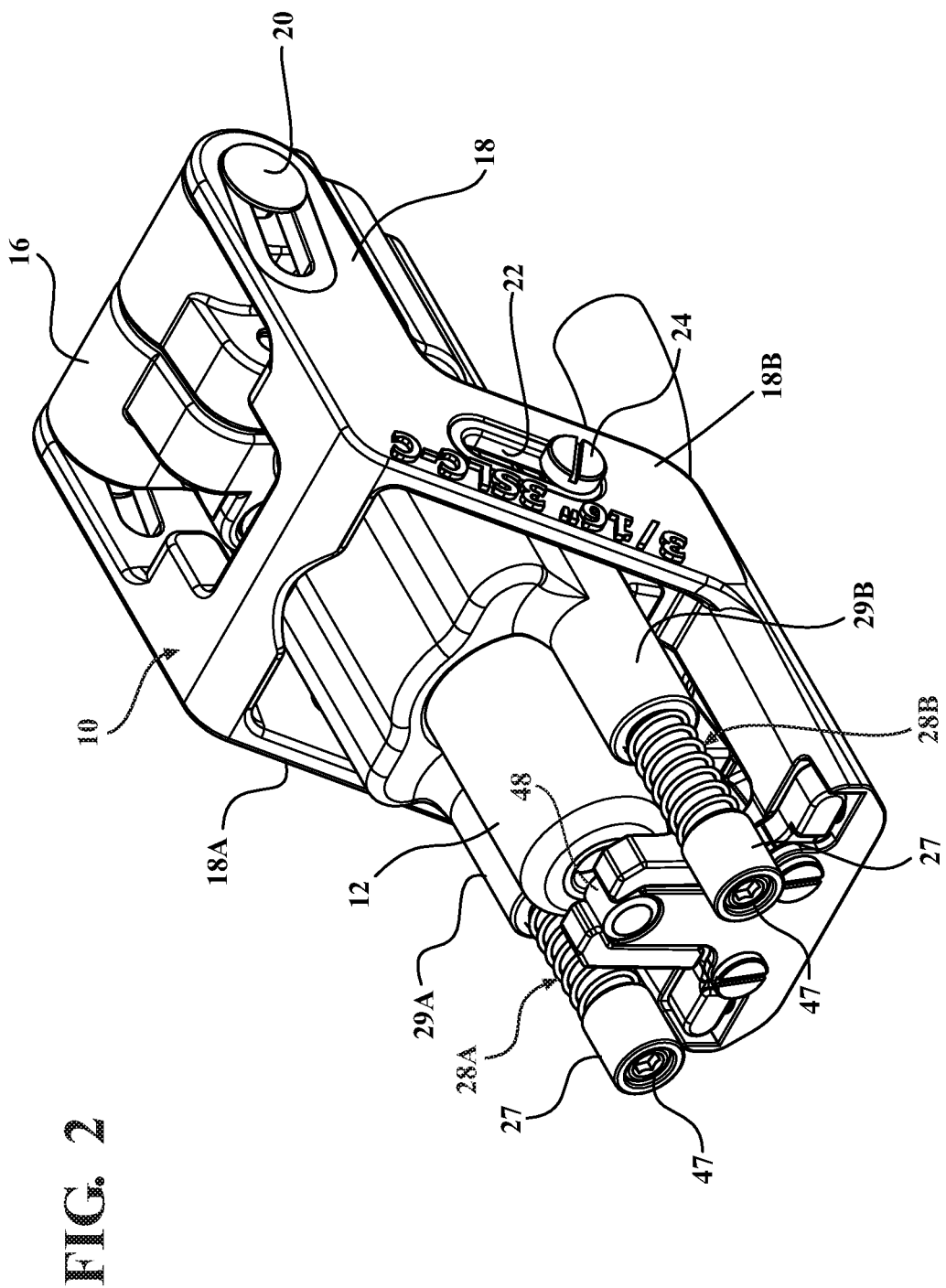
FIG. 2 is a perspective view of the feeder apparatus mounted on a swaging tool nose piece.
Figure 5:
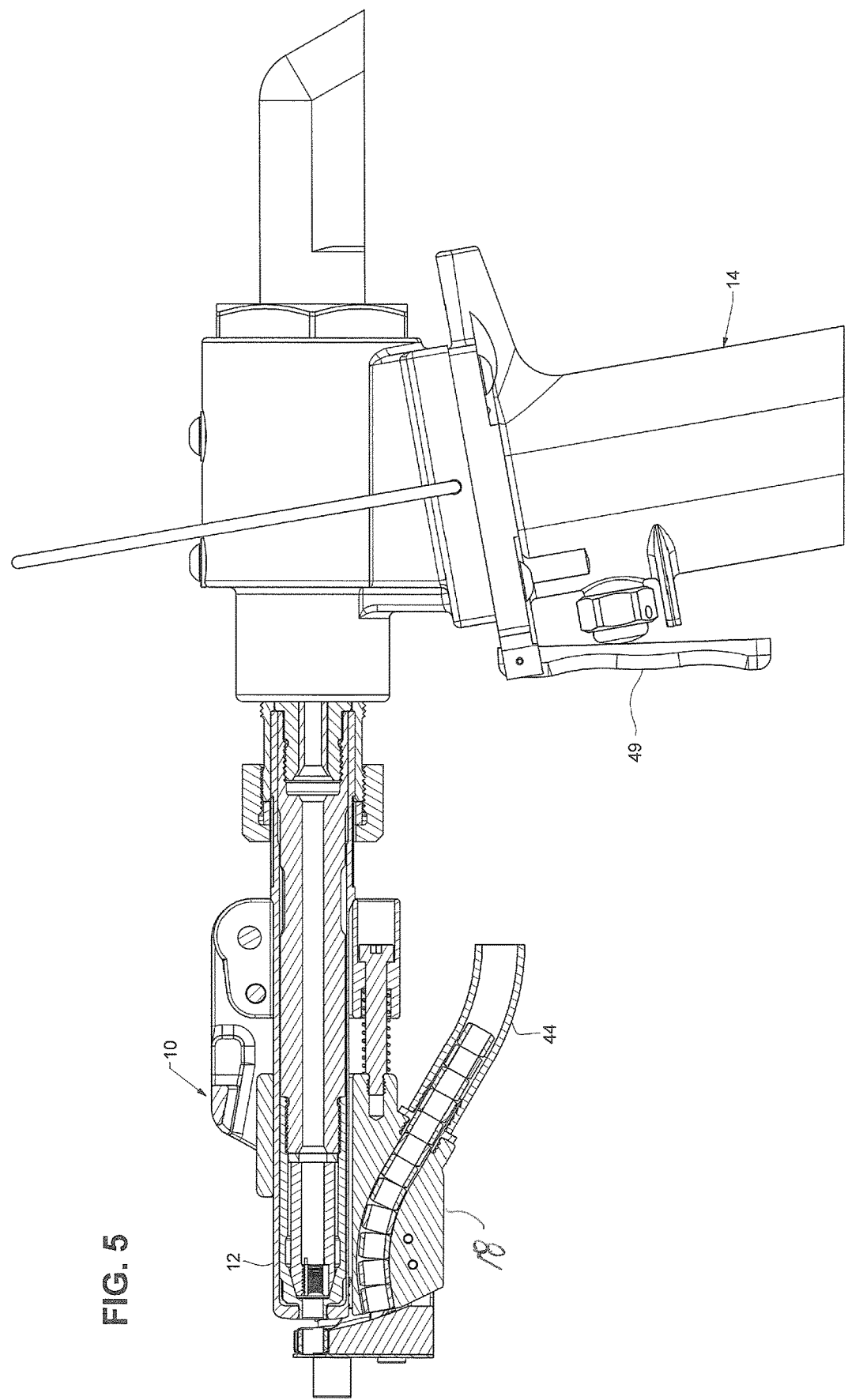
FIG. 5 is a side view, partly in section, showing the tool and feeder placing a collar on a lockbolt before swaging.

As shown in FIG. 2, the actuator assemblies 26, 28A-28B are housed within left and right tubular portions 29A and 29B of the front movable body assembly 100. Screws 47 are sunk into recesses in member 27. Within each of the tubular assemblies 29A and 29B are primary springs 32 (see FIG. 13) as well as slide rods 34 between the springs to allow the actuator assembly 28A-28B to be resiliently moved toward the rear stationary body assembly 16 by pressure exerted by an operator who places the contact members 27A-27B against a workpiece and pushes the tool 14 and the feeder assembly 10 toward the workpiece as hereinafter described. In the embodiment illustrated, a second stage of movement can be caused by the tool in performing swaging operation. The primary springs 32 in the illustrated embodiment have a lower spring compression coefficient than the secondary springs 30 and therefore compress to a greater extent than the secondary springs when the operator pushes the device 10 toward the workpiece 33 in which lockbolts 31 are pre-installed. As an alternative, the operator can fully depress a set of assemblies by pushing against a workpiece surface.

Figure 13:
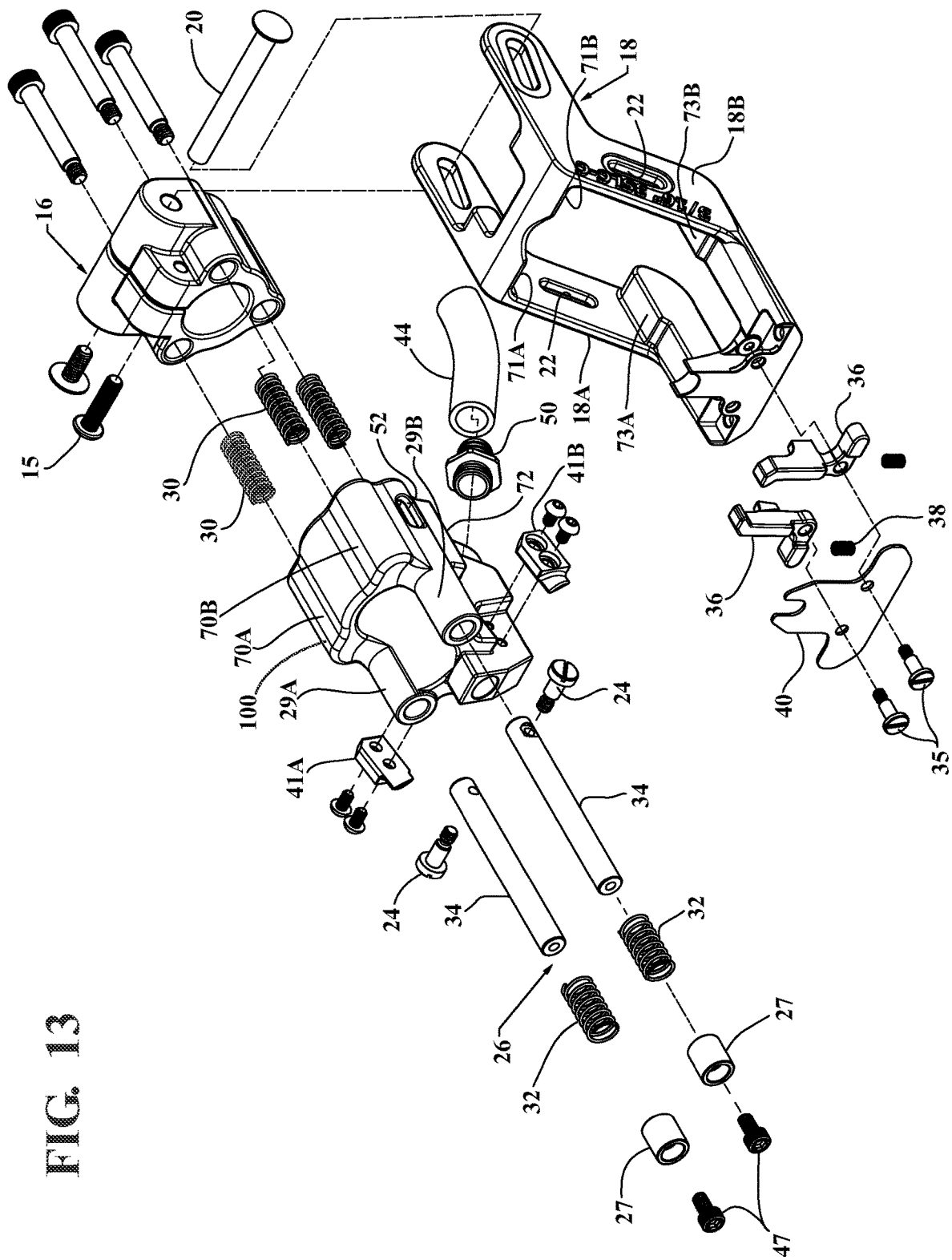
FIG. 13 is an exploded view showing all the parts of the feeder device.
Figure 14:
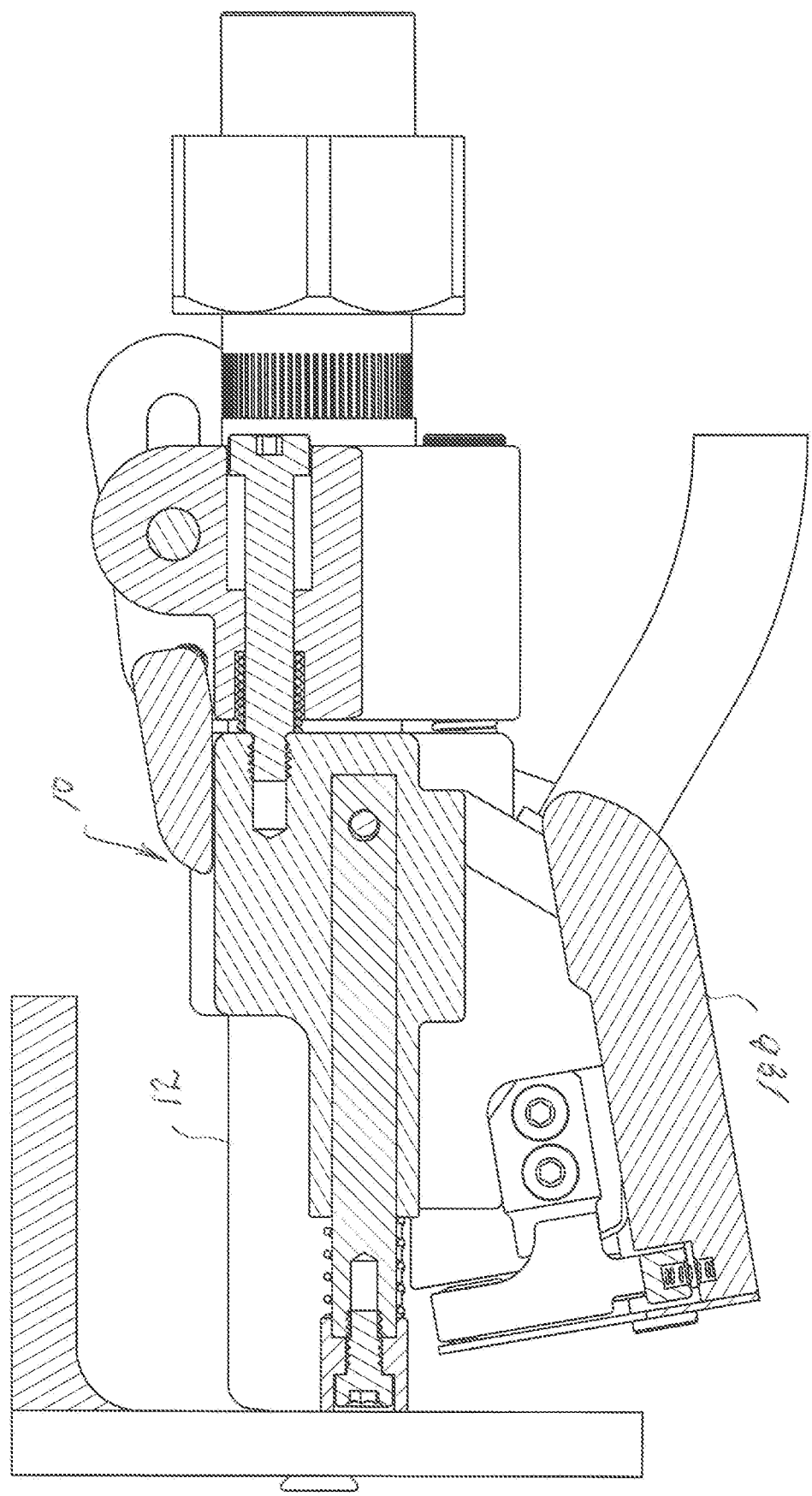
FIG. 14 is a side view in section of the feeder showing the lower assembly and the front moveable assembly when the barrel and the rear stationary body are urged forward during the swaging of the collar.

The lower assembly 18 carries a number of components including a gripper 36 with left and right arms connected to the lower assembly by screws 35 and held in a closed or gripping position by means of a spring 38 that fits into blind holes on the bottom of the gripper elements as shown in FIG. 13 to hold a lockbolt collar in the presentation position ready to be applied to the shank of a lockbolt. The gripper is opened by cams 41A and 41B mounted on the front movable body 100 assembly to open and receive a collar from the magazine 44 when the lower assembly is moved down to the lower position shown in FIG. 10.

The pivotal lower assembly 18 also carries a metal stop plate 40 which is screwed onto the forward distal ends of the parallel legs in front of the gripper 36.

The device 10 is connected to receive collars from an attached tubular magazine 44 which may be in the form of a flexible hose. The collars are driven toward the locator stop plate 40 by air pressure from a source (not shown) so that the collars continue to arrive into the loading position against stop plate 40 one at a time.

The tool has a trigger 49 which the operator uses to trigger the swaging operation once the lockbolt in the presentation position has been appropriately placed on the shank of a lockbolt and the tool and feeder assembly are urged toward a work surface as described above. Details of the power tool are omitted herein but can be seen in full in the product brochure available from Gage built corporation in Clinton Township Mich. The nose assembly details are described in the document available and can pivot relative to the first assembly. The contents of these documents both are available to the public, incorporated herein by reference.

Figure 7:
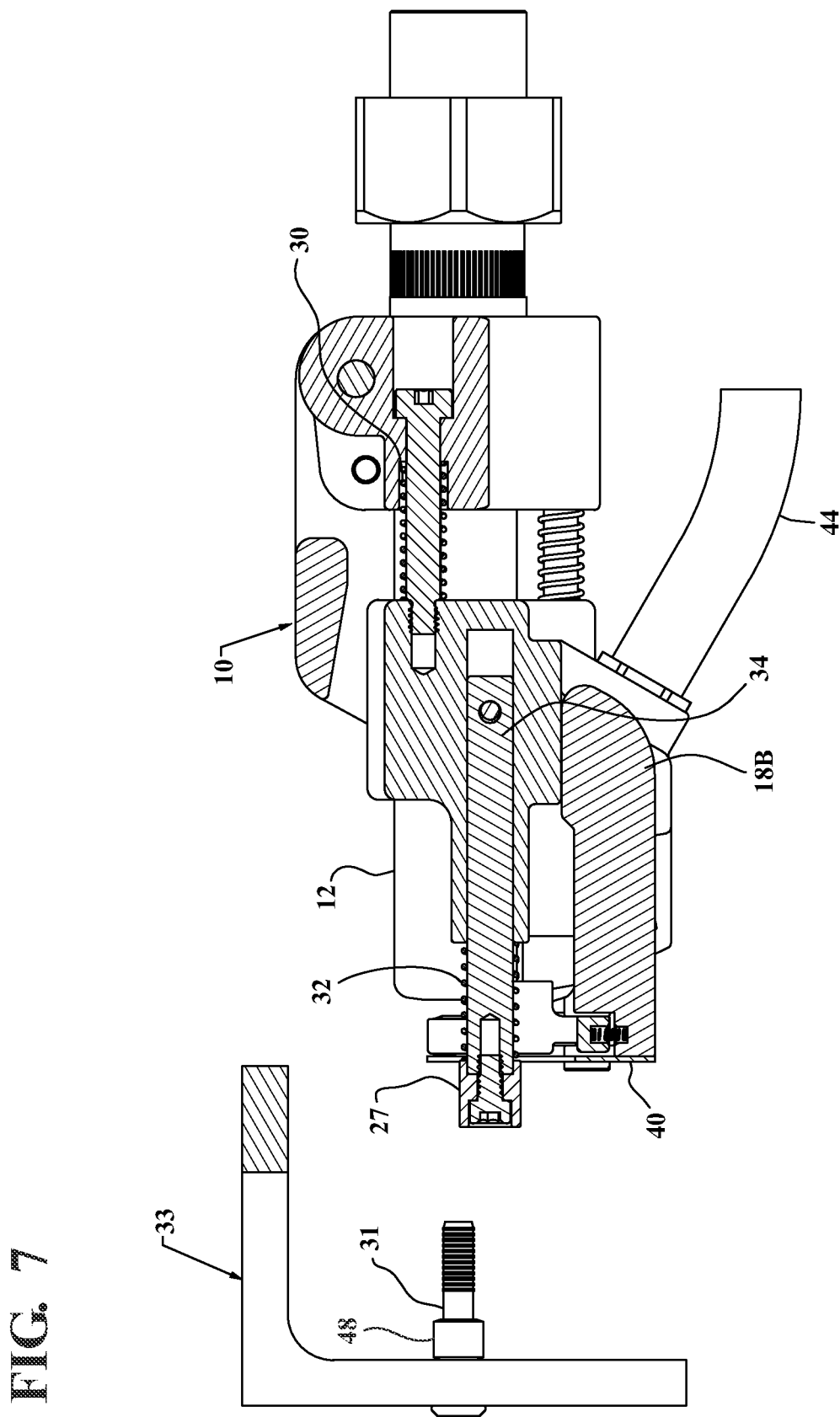
FIG. 7 is a side view of the feeder in section showing details of the actuator assembly after a collar has been swaged.
Figure 8:
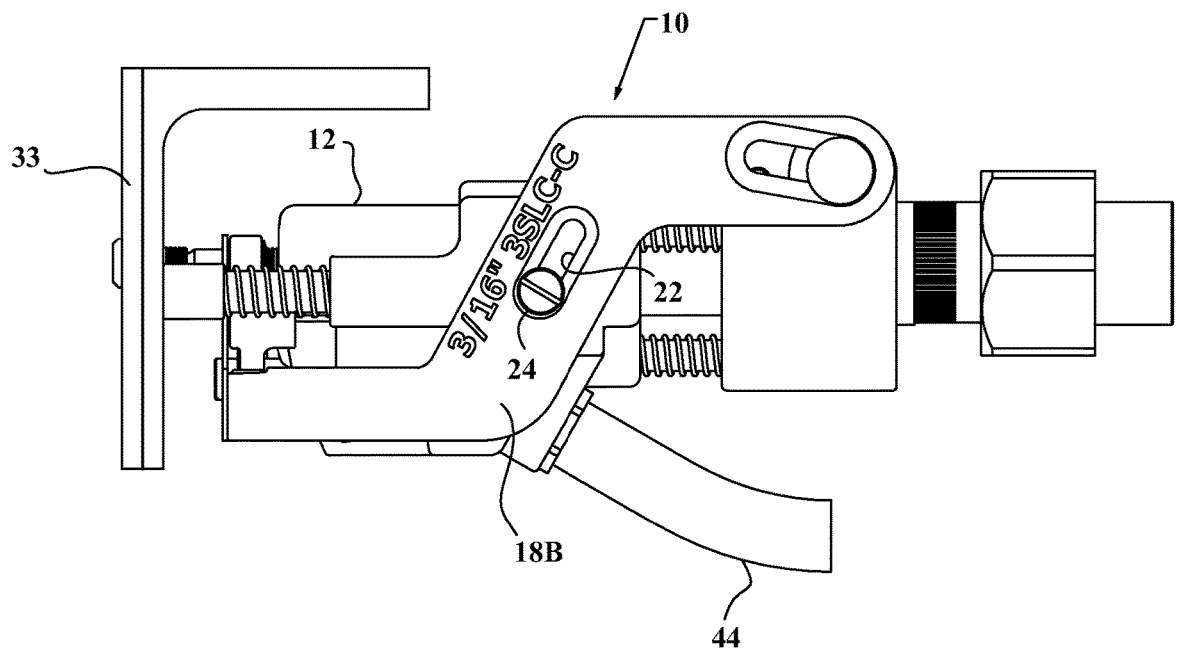
FIG. 8 shows the feeder placing a collar on the lockbolt but not yet urged forward to compress the springs in the actuator assembly.
Figure 10:
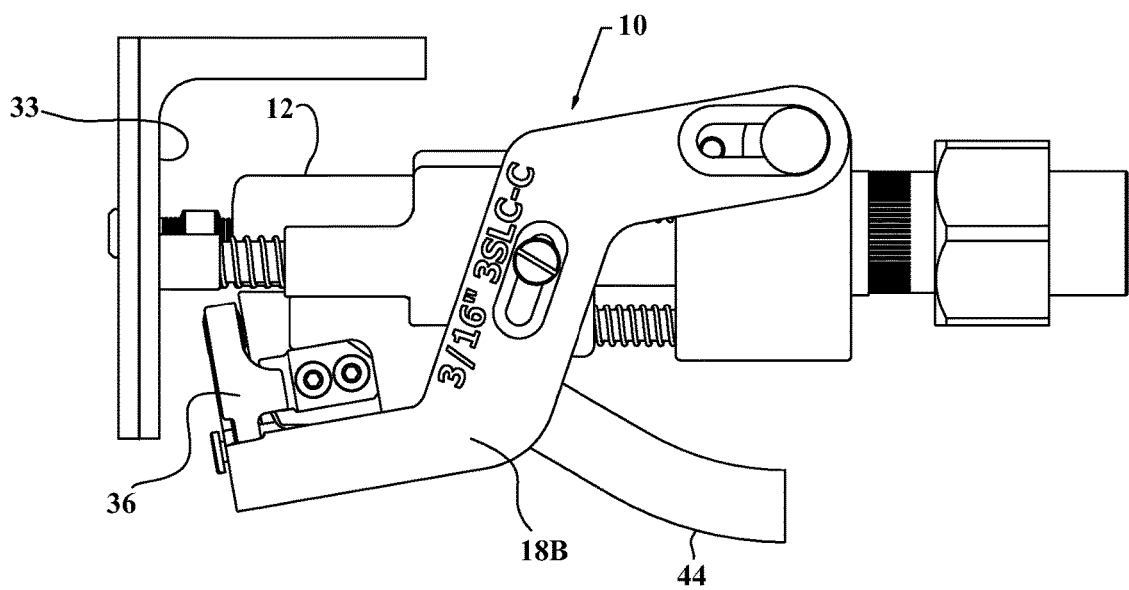
FIG. 10 shows the feeder after it has been pushed against the workpiece to pivot the lower assembly down to pick up the next lockbolt collar from the supply tube.
Figure 9:
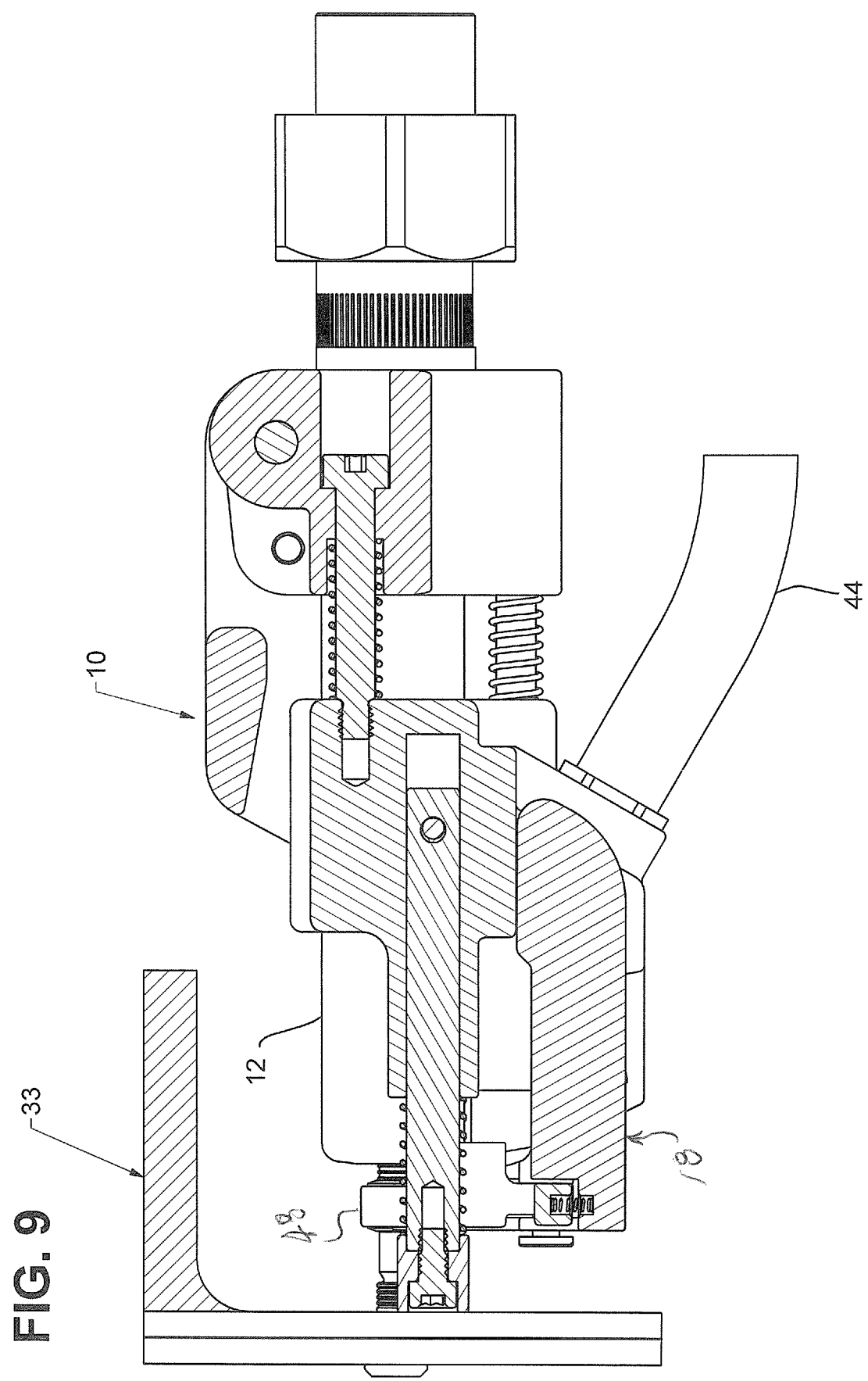
FIG. 9 shows the feeder in section and in the same position as shown in FIG. 8.
Figure 11:
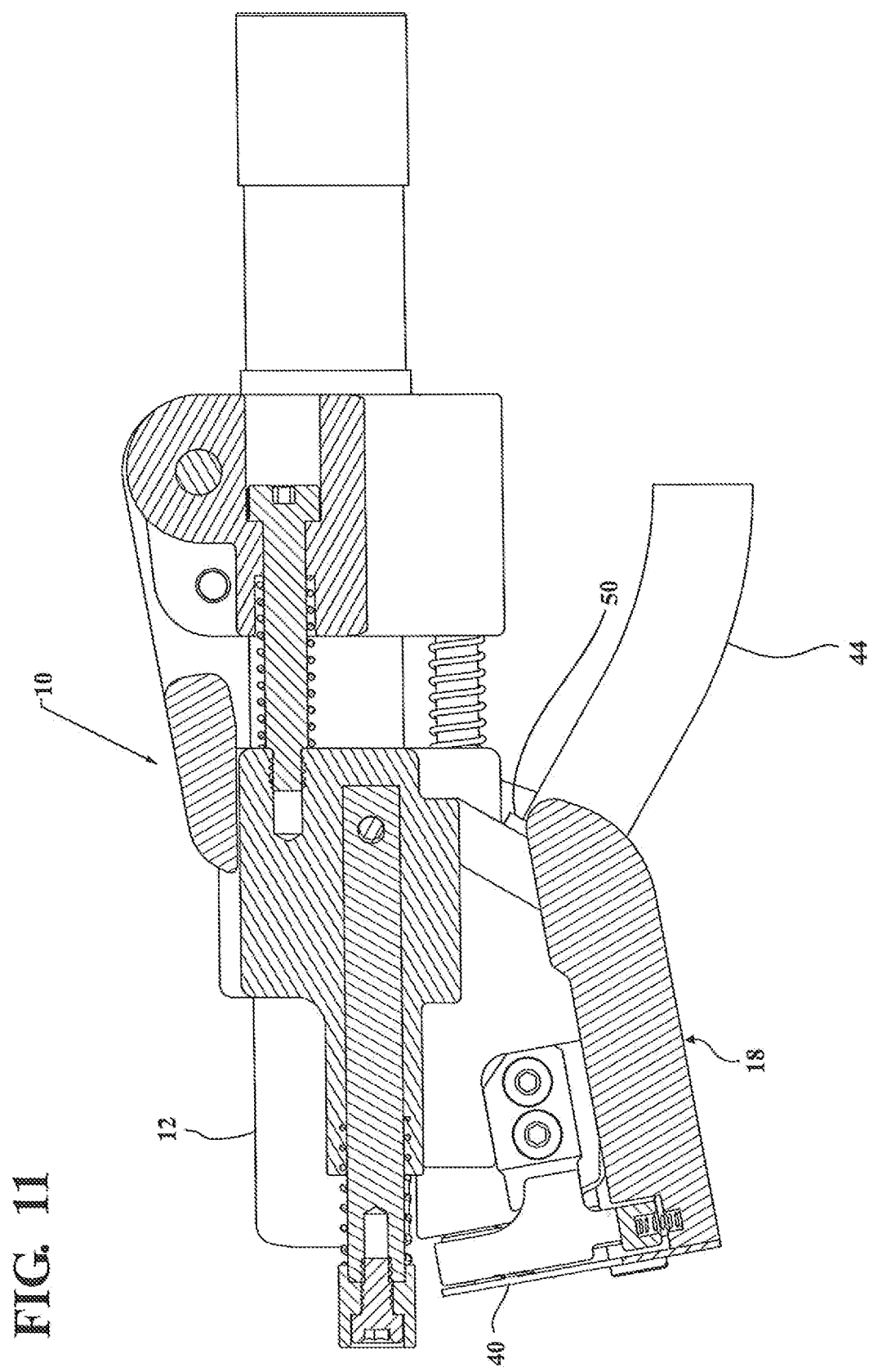
FIG. 11 shows the feeder in the same position as FIG. 10, but in section to show interior detail of the actuator assembly.

Turning now to FIGS. 2 through 12, FIG. 2 shows in perspective the feeder device 10 with a lockbolt collar 48 in the presentation or "ready" position and the lower assembly 18 in the fully raised position. This is evident from the position of the shoulder bolts 24 at the lower ends of slots 22 and it will be understood from reference from FIG. 13 that the shoulder bolts 24 are threaded into the slidable rods 34 which are part on the compressible spring assemblies through slots 52 in the tubular portions 29A and 29B of the front moveable body assembly 100 so that movement of the rods toward the rear of feeder 10 causes a caroming function driving the shoulder bolt shanks upwardly in the slots 22 and causing counter-clockwise pivotal motion of the lower assembly 18 as hereinafter described. Limit stops are provided on the upper and lower assemblies, more specifically, FIGS. 9, 11, and 13 show stop pads 70A, 70B on the front movable body assembly 100 and pads 71A, 71B on the lower assembly 18 to limit downward motion of the lower assembly 18 relative to the front movable body assembly 16. Similarly, stop pads 72 on the front movable body assembly and co-acting pads 73A, 73B on the lower assembly limit upward movement of the lower assembly 18 back toward the front movable body assembly 100 to the position shown, for example, in FIG. 7.

Figure 6:
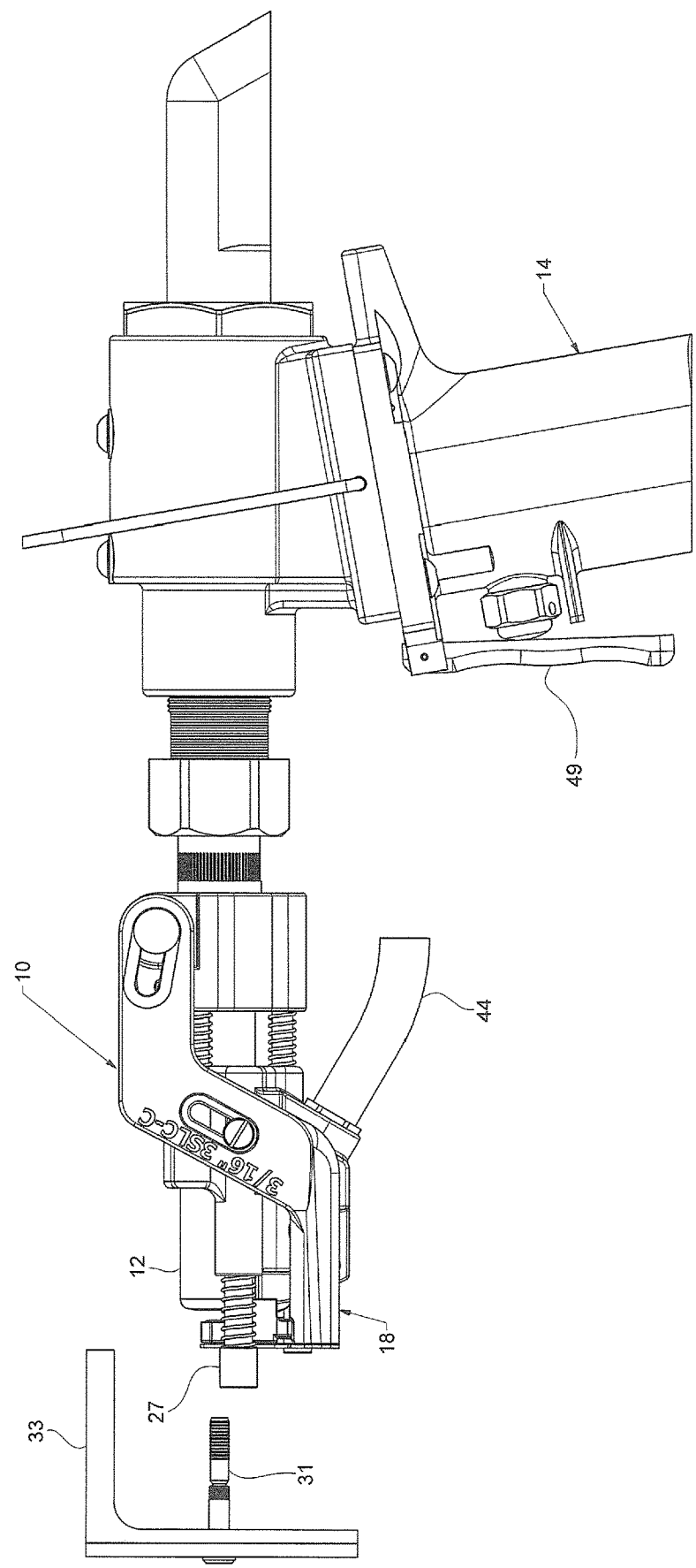
FIG. 6 is a side view of the feeder approaching a lockbolt ready for receipt of a collar.

The side view of FIGS. 6 and 8 shows the feeder 10 mounted on the nose assembly of the tool 14 and with lower assembly 18 still in the raised position. The feeder assembly 10 ready to place a lockbolt collar onto the shank 31 of lockbolt.

FIG. 10 shows the feeder device 10 advanced forwardly so that the collar in the presentation position is now on the shank of the lockbolt and the actuator assembly 28A-28B are in contact against the surface of the work piece 33.

As shown in FIGS. 10 and 11, the operator pushes the feeder device and the tool forward against the work surface, fully compressing the primary spring assemblies and driving the shoulder bolts upwardly along the slots 22 to pivot the lower assembly 18 downwardly to open the gripper jaws. The lockbolt collar in the presentation position is thereby free so that the nose assembly 12 of the swaging tool 14 can perform the swaging function as well the function of pulling the pintail off of the lockbolt shank where it becomes waste.

Figure 12:
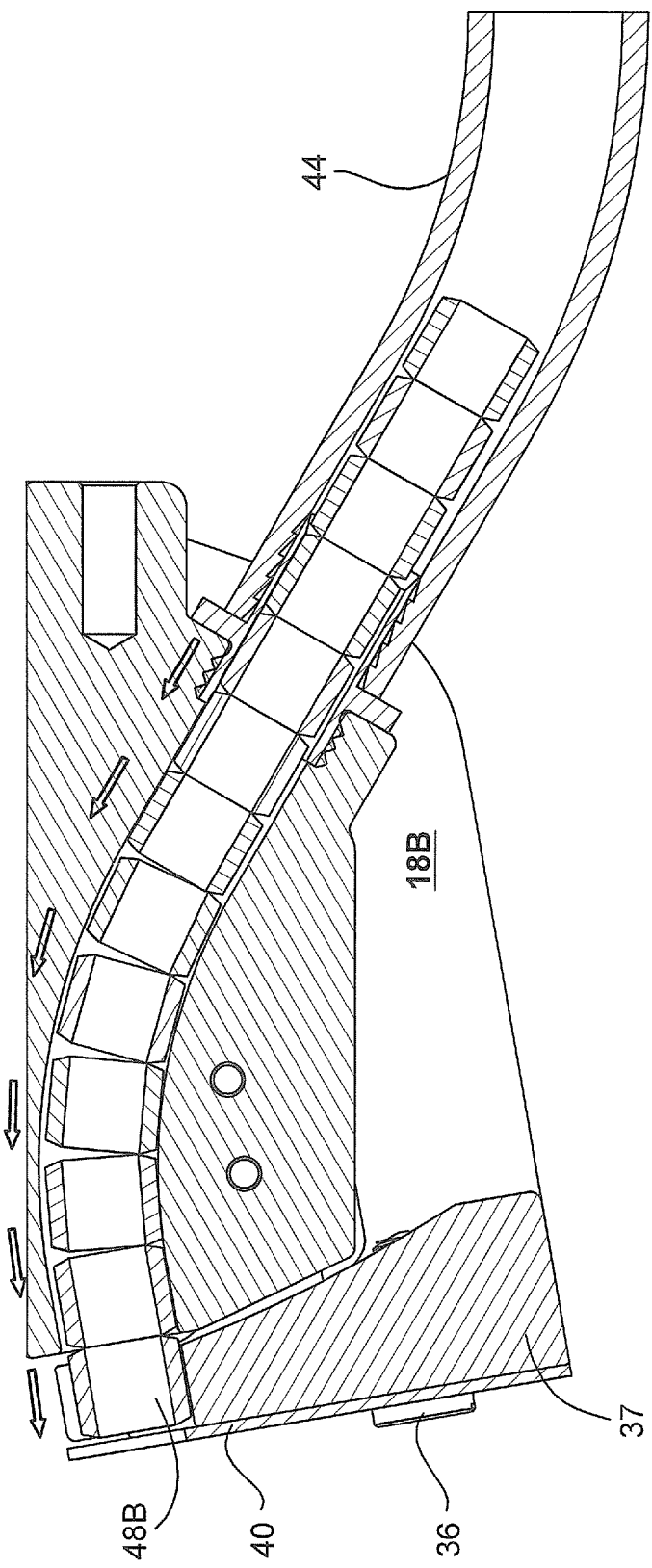
FIG. 12 is a side view in section of the feeder tube in the front moveably body assembly.

As shown in FIGS. 10 and 11, compression of the secondary springs 30 occurs during the swaging and pulling functions performed by the nose assembly 12 in the tool 14 as shown in FIG. 12, the magazine tube 44 is bent downwardly as necessary. Before reaching the full down position shown, i.e., when only springs 32 are compressed, the inside face of member 37 prevents collar 48B from moving fully forward where it can be picked up by gripper 36. When the springs 30 are compressed by the final forward motion of the feeder device 10 in the swaging step, the lower assembly 18 moves to the position shown, allowing the collar 48B to move between the now open jaws of the gripper and where the locator stop plate 40 stops and positions the collar. The lockbolt collar 48B is then picked up by the lower assembly 18 and will be raised up into the presentation position once the operator releases pressure on the tool and backs it away from the finished, swaged collar on the previous lockbolt. The magazine tube 44 moves with the transfer assembly 18 to which it is attached along with gripper elements 36.

As shown in FIGS. 10 and 11, the operator has swaged the collar pressure on the tool: i.e., the lower assembly 18 is still in the down position and the swaging process is in operation so as to swage the collar onto the lockbolt shank and put sufficient axial load onto the pintail of the lockbolt to break it off to complete the installation process.

FIG. 7 shows the feeder 10 is pulled away from the swaged fastener and both primary and secondary springs re-expand to their uncollapsed positions driving the lower assembly 18 with a newly loaded collar back to the raised starting position such that the next collar from magazine 44 is now in the presentation position ready to be inserted on the next lockbolt shank and to begin the process over again.

Summarizing the apparatus, the feeder 10 is mounted on a nose assembly capable of swaging collars on lockbolts, and the front movable body assembly is connected to an air-driven collar supply. Springs 30, 32 urge the actuation members 28A-28B away from the body of the front movable body assembly 100 and the shoulder bolts 24 reside in the lower ends of slots 22 as shown in FIG. 8. The cams 41 allow the gripper 36 to hold a collar in the presentation position. When members 28A-28B are pushed against workpiece 33, springs 32 collapse, bolts 24 ride up slots 22 to pivot the lower assembly 18 down; simultaneously, cams 41A, 41B open the gripper 36 to allow the next collar to be picked up from the magazine 44.

SUMMARY OF OPERATION

Summarizing the method of operation of the feeder device 10, the device is attached to the nose assembly of a swaging tool and to a supply of serially-arranged swageable collars. A collar is brought to the presentation position in axial alignment with the nose assembly anvil and steered by the operator onto a lockbolt shank. The operator pushes the device 10 against the workpiece surface to compress the primary springs 32 in the upper assembly 100 and drop the lower assembly 18 down. This opens the gripper to release one collar onto the lockbolt and make ready to receive the next collar from magazine 44. The operator presses the trigger on the tool 14 to swage the collar that has been placed on a lockbolt shank. This action fully compresses the springs 30, 32 and opens the gripper. The operator then withdraws the tool and feeder device, allowing the primary and secondary springs to expand, raising the lower assembly legs and bringing a new collar up to the presentation position. The operator can perform these steps with one hand.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures and methods of use as is permitted under the law. For example, the device can also operate with one set of springs which are fully compressed by the operator, thus eliminating the two-stage compression function described above.

What is claimed is:

1. An apparatus for feeding swageable collars onto the shanks of lockbolts pre-located in a workpiece so as to extend from a surface of the workpiece comprising:
   a fluid powered swaging tool defining a working axis and having as an integral part thereof an axially oriented nose piece;
   a first assembly (16) mounted in a fixed axially rearward position on the nose piece;

a second assembly (100) slidably mounted on the nose piece in an axially forward position relative to the first assembly;

a collar transfer assembly having a pair of arms (18A, 18B) pivotally attached to said first assembly and extending axially forwardly to front ends to straddle said nose piece and said second assembly;

each of said arms of said transfer assembly having a cam slot formed therein;

said arms carrying a collar gripper at and between said front ends thereof;

first and second rods (34) slideably mounted to said second assembly for displacement relative and parallel to said working axis and having contact ends located forwardly of and on opposite sides of said collar gripper;

each of said first and second rods carrying a cam actuator member (24) extending into respective cam slots in said transfer assembly arms, whereby axial displacement of said first and second rods pivots said arms of said transfer assembly;

a magazine carrying collars in co-axially stacked orientation connected to said transfer assembly and having a collar outlet;

whereby said first and second rods in an axially forward position place said arms of said transfer assembly to a first position where said collar gripper is in axial alignment with said working axis and whereby said first and second rods in an axially rearward position place said arms of said transfer assembly in a second position where said collar gripper is in axial alignment with said magazine collar outlet; and first springs resiliently biasing said first and second rods to the axially forward position but being compressible by rearward pressure against the ends of said first and second rods to push said first and second rods axially rearward relative to said second assembly to pivot said collar transfer assembly away from the first position in axial alignment with said working axis.

2. The apparatus as set forth in claim 1, wherein said second assembly is slidably mounted on the nose piece and at least one secondary spring (30) is located between the first assembly and second assembly to provide spring force resiliently resisting movement of said second assembly toward said first assembly and returning the second assembly to the axially forward position on said nose piece when force compressing said at least one secondary spring is removed, said at least one secondary spring has a higher spring compression coefficient than said first springs.

3. The apparatus as defined in claim 1 further comprising a stop plate mounted on the front end of said collar transfer assembly arms and forward of said collar gripper.

\* \* \* \* \*